Figure 1:
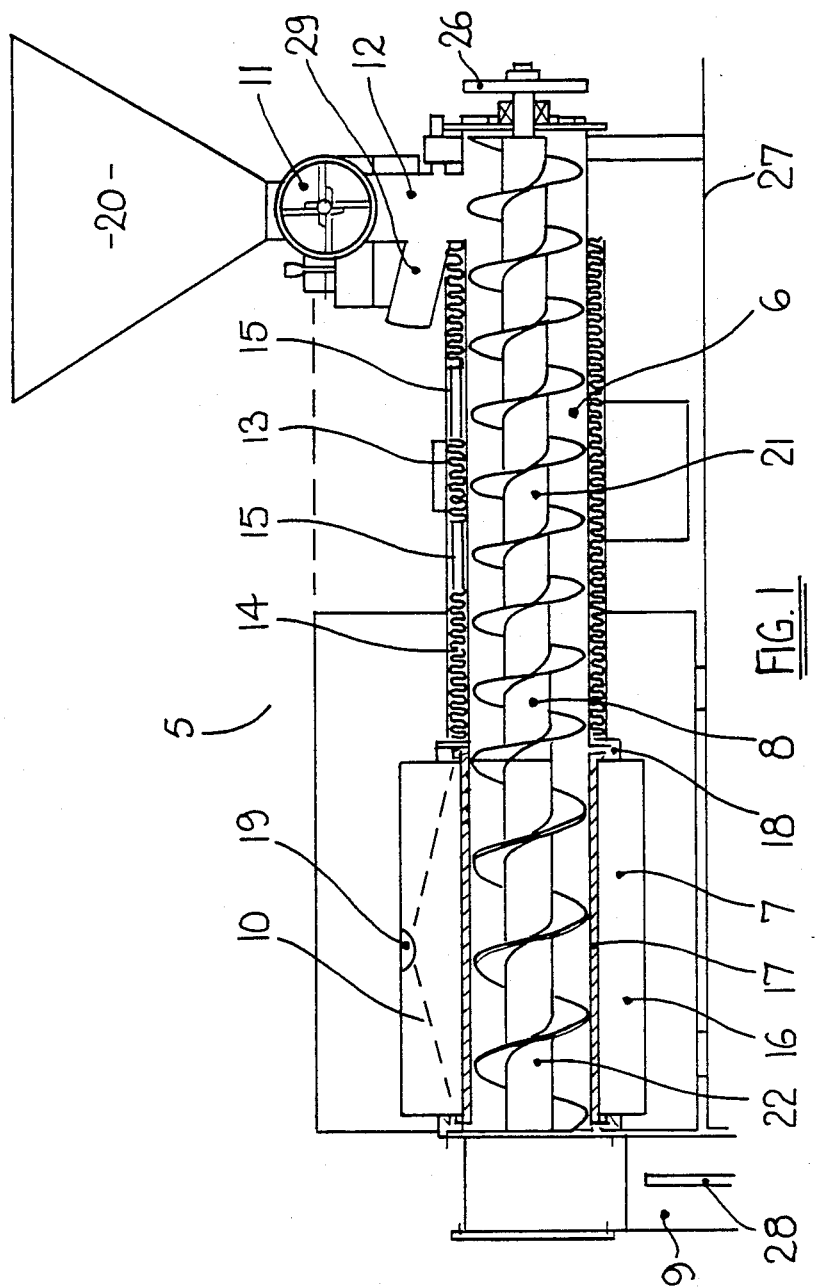

United States Patent [19]

MacKenzie

[11] Patent Number: 4,608,261
[45] Date of Patent: Aug. 26, 1986

[54] METHOD AND APPARATUS FOR PRODUCING A PUFFED FOODSTUFF

[75] Inventor: Ross A. MacKenzie, Auckland, New Zealand

[73] Assignee: New Zealand Government Property Corporation, Wellington, New Zealand

[21] Appl. No.: 664,430

[22] Filed: Oct. 24, 1984

[30] Foreign Application Priority Data

Nov. 4, 1983 [NZ] New Zealand .......................... 206150

[51] Int. Cl.$^4$ ............................ A23L 1/18; A23L 3/18
[52] U.S. Cl. ..................................... 426/242; 99/323.4; 219/10.55 A; 219/10.55 M; 426/445; 426/446
[58] Field of Search ............... 426/243, 242, 241, 445, 426/446, 520, 233, 557; 219/10.55 R, 10.55 A, 10.55 M; 99/483, 443 C, 339, 323.4

[56] References Cited

U.S. PATENT DOCUMENTS 3,906,115  9/1975  Jeppson .............................. 426/243
4,208,439  6/1980  Hsu .................................... 426/557
4,410,553  10/1983 McGinty ............................. 426/243

FOREIGN PATENT DOCUMENTS 2110803A  6/1983  United Kingdom ........ 219/10.55 A

*Primary Examiner*—George Yeung
*Attorney, Agent, or Firm*—Holman & Stern

[57] ABSTRACT

A method of processing a foodstuff raw material in particulate form is described as is apparatus for performing the method. Both method and apparatus involve preheating the particulate food material in a preheating chamber and then subjecting the preheated food material to heating by microwave energy in a main processing chamber. A helical screw conveyor is provided to convey the particulate matter through the preheating and main processing chambers. The pitch of the helical screw conveyor is wider where the conveyor passes through the main processing chamber than the pitch where the screw conveyor passes through the preheating chamber.

10 Claims, 2 Drawing Figures

METHOD AND APPARATUS FOR PRODUCING A PUFFED FOODSTUFF

This invention relates to food processing and more particularly, to food processing apparatus and/or a method of processing a food raw material and/or a processed foodstuff.

It is an object of the present invention to provide food processing apparatus and/or a method of processing a food raw material and/or a processed foodstuff which will at least provide the public with a useful choice.

Accordingly in one aspect the invention consists in food processing apparatus for processing a foodstuff raw material in particulate form, said apparatus comprising a preheating chamber; a main processing chamber arranged to receive product from said preheating chamber; a microwave generator, the output of which is directed into the main processing chamber; and conveying means enclosed within said apparatus to convey the raw material through said preheating chamber then through said main processing chamber and deliver the processed product to an outlet.

In a second aspect the invention consists in a method of processing a foodstuff raw material in particulate form, said method comprising the steps of:

conveying the particulate raw material through a preheating chamber and subjecting the material to preheating therein subsequently conveying the preheated material through a main processing chamber and subjecting the material to further heating by microwave energy; and delivering the resulting product to an outlet.

In a third aspect the invention consists in a food product when processed by the apparatus or according to the method hereinbefore set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Figure 2:
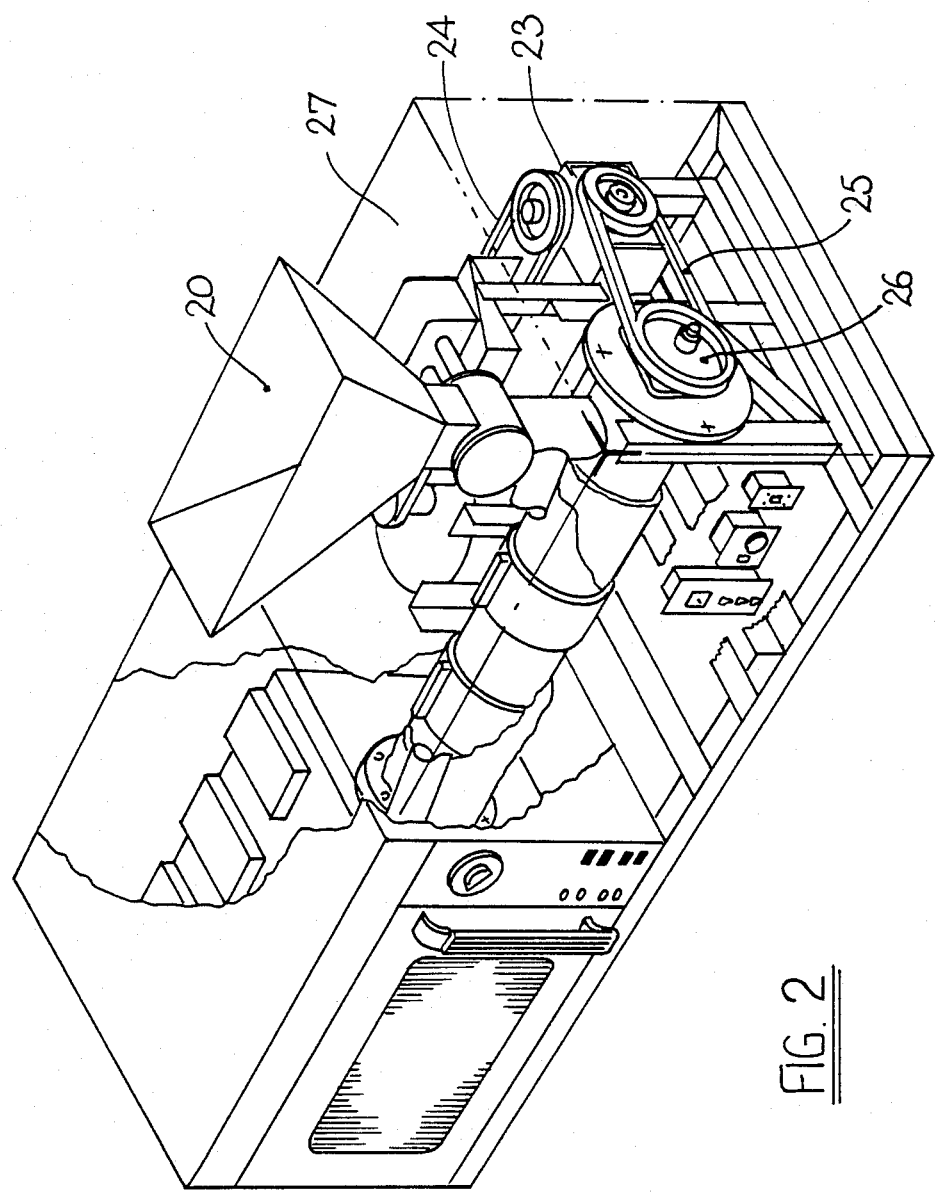

One preferred form of the invention will now be described with reference to the accompanying drawings in which:

FIG. 1 shows an isometric view, partly in section, of food processing apparatus constructed in accordance with the invention; and FIG. 2 shows a schematic cross sectional view of the food processing apparatus according to the invention.

Referring to the drawings, food processing apparatus 5 is provided which is particularly suitable for processing farinaceous substances such as pasta pellets, but it will be appreciated by those skilled in the art that the invention could also be used to process other foodstuffs from raw material in particulate form.

The apparatus 5 includes a preheating chamber 6, a main processing chamber 7 and conveying means 8 to convey the raw material through the preheating chamber 6, the main processing chamber 7 and deliver the processed foodstuffs to an output 9. A microwave energy source 10 is provided to subject the raw material passing through the main processing chamber 7 to microwave energy and metering means 11 is preferably provided to meter the raw material through input duct 12 onto the conveyor 8 at a predetermined rate.

In the form shown, the preheating chamber 6 comprises a tubular member 13 preferably formed from stainless steel, the exterior surface of the tubular member 13 being provided with a layer 14 of insulating material and having heating means preferably in the form of electric band heaters 15 applied thereto so as to direct heat into the interior of the tubular member 13. The main processing chamber 7 consists of a microwave cavity 16 and a tubular conveyance section 17 passing through the cavity 16. The section 17 is of the same diameter as, and co-axial with, the tubular preheat section 13 and is arranged to receive product therefrom, suitable sealing means 18 being provided between the sections 13 and 17. A microwave generator indicated schematically by reference numeral 19 is mounted within the microwave cavity 16 to apply microwave energy to raw material passing through the tubular conveyance section 17, the conveyance section 17 being formed from a material transparent to microwave energy such as, for example, glass.

The metering means 11 preferably comprises a rotary valve feeder and the speed of this rotary valve feeder can be altered so as to meter the raw material loaded into hopper 20 on to the conveying means 8 at the desired rate.

In the form shown the conveying means 8 comprises a helical screw mounted within that part of the apparatus defined by tubular preheat section 13 and tubular conveyance section 17, the clearance between the screw and the tubular walls being set to ensure that the raw material being processed remains within the screw and does not 'leak' through the gaps between the outer extremities of the screw and the tubular walls. The screw is preferably also formed in two co-axial sections, the section 21 being formed from, for example, stainless steel to assist heat transfer to the raw material during the preheat operation while the section 22 is formed from a microwave transmitting heat resistant material e.g. PTFE. It will be noted that the pitch of the section 21 is finer than that of section 22. Typically the pitch of section 22 is 1.5 times that of the section 21 and this is to take into account the fact that the volume of the raw material increases several fold upon being subjected to microwave energy in the main processing chamber.

The helical screw conveyor is rotated by means of an electric motor (not shown) through the gear box 23 and belt transmissions 24 and 25, the belt transmission 25 driving the pulley 26 mounted on the input end of the screw conveyor.

The preheating chamber 6, the main processing chamber 7 and the output 9 are formed from metal which provides a barrier to microwave energy and are enclosed in cabinet 27. Further, the output duct 9, and the input duct 12 are dimensioned to, in effect, comprise wave guides of a form such that the mircowave energy used in the apparatus is of a frequency lower than the cut-off frequency of the wave guides. Thus the microwave energy falling on the output duct 9 and the input duct 12 will not be propogated. To this end, the output duct 9 is preferably of rectangular cross section and the dimension of the cross section are less than one half the wave length of the microwave energy used, the length of output duct 9 being sufficient to ensure that the microwave radiation at the output end as at a 'safe level,' 'safe level' being defined in World Health Organisation (WHO) standards. Depending on the microwave energy used and the duct dimensions, a baffle 28 may if necessary be mounted in the output duct to, in effect, provide two ducts sufficient to ensure that the microwave radiation at the exit is at a 'safe level'.

The input duct 12 is configured in a similar manner to prevent propogation of microwave energy and may also be provided with a baffle (not shown) if necessary.

The input duct 12 is also shown in FIG. 2 as being provided with a branch duct 29. This branch duct 29 may be connected to the magnetron blowers (not shown) of the microwave energy generator 19 so that waste heat from the magnetrons (not shown) is supplied to the input duct to assist in the preheating operation and thus conserve energy. A further advantage arising from this hot air flow through the duct 29 is that air flow is, in turn, generated through the passage defined by tubular sections 13 and 17 which removes moisture generated by the cooking process.

In use, the raw material to be processed, in particulate form, is supplied to the hopper 20 and is released on to the rotating screw 8 by the metering means 11. As the product passes through the preheating chamber 6 it is subjected to preheating by convection and, possibly, hot air circulation and thereafter it passes through the main procesing chamber 7 where it is subjected to heating by microwave energy. The processed foodstuffs then passes out through the output duct 9 for collection and/or packaging.

The invention has been devised particularly to provide means for puffing pasta pellets and during processing the volume of the pellets increases approximately nine-fold. Generally, though not necessarily, the output from the microwave generator 19 is constant while the output from the heating bands 15 is adjusted so as to maintain a constant though adjustable temperature in the preheating chamber 12. Accordingly, any variations in cooking conditions are provided by altering the spped of the conveyor 8 and/or the rate of delivery of the food product on to the conveyor.

Obviously, the dimension and specification of the various components will vary according to the nature of the raw material being subjected to processing in the apparatus, and the throughput required. However, we have obtained a commercially acceptable puffed pasta product using a pilot machine having a microwave energy source with an average power requirement of about 4KW a nominal output of about 2KW. Two band heaters 15 were provided rated at 1KW each and gave a preheat temperature of about 180° C. The outer extremities of the screw 8 were 140 mm in diameter where the pitch of sections 21 and 22 were 80 mm and 120 mm respectively. The speed of the screw was infinitely variable between 2 and 30 r.p.m. but operated generally at about 15 r.p.m. and received raw material from the hopper at a rate of 8 to 15 kg/hour depending on the configuration of the raw material.

It will thus be appreciated that the present invention provides a simple, yet effective form of food processing operation which, at least in the preferred embodiment described has the following advantages:

1. Pasta pellets can be effectively and evenly puffed without contact with a liquid heat exchange medium such as cooking oil or a solid heat exchange medium such as salt.

2. The absence of any contact with liquid or solid heat exchange media allows for greater flexibility in product formulation as the product does not take in any flavouring from the heat exchange media during processing.

3. The product can be produced in relatively large quantities, on a continuous basis, from a relatively compact machine.

While the preferred embodiment described has been devised particularly for puffing pasta pellets the apparatus could also be used for popping corn and even for heating nuts and the like which, in their base form, comprise discreet particles.

What is claimed is:

1. An apparatus for producing a puffed foodstuff from a raw food material in particulate form, said apparatus comprising a preheating chamber for preheating the raw food material; a main processing chamber arranged to receive preheated raw food material from said preheating chamber; a microwave generator arranged to direct microwave energy into the main processing chamber to puff the food material; screw-conveying means enclosed within said apparatus to convey the raw food material through said preheating chamber then through said main processing chamber and deliver the the resulting puffed foodstuff to an outlet, said screw-conveying means being of a material substantially transparent to micro-waves where said conveying means passes through said main processing chamber, the pitch of said screw-conveying means being wider where said conveying means passes through said main processing chamber than the pitch where said conveying means passes through said preheating chamber.

2. The apparatus as claimed in claim 1 further including metering means to meter the raw food material to be processed on to said conveying means at a controlled rate prior to entry into said preheating chamber.

3. The apparatus as claimed in claim 2 wherein said metering means comprises a rotary valve feeder.

4. The apparatus as claimed in claim 1 wherein said screw-conveying means is enclosed in a tubular conveyance channel which passes through said preheating chamber and said main processing chamber, said tubular conveyance channel being substantially transparent to micro-waves where it passes through said main processing chamber.

5. Apparatus as claimed in claim 4 wherein electrical band heaters are applied to said tubular conveyance where said tubular conveyance passes through or defines said preheating chamber.

6. The apparatus as claimed in claim 1 further including means to direct hot air from said preheating chamber into said main processing chamber.

7. The apparatus as claimed in claim 1 wherein the input into said preheating chamber and the output from said main processing chamber comprise wave guides of a dimension such that the microwave energy used in the apparatus is of a frequency less than the cut-off frequency of the wave guides.

8. A method of producing a puffed foodstuff from a raw food material in particulate form, said method comprising the steps of: conveying the particulate raw food material by a screw-conveying means through a preheating chamber and subjecting the food material to preheating therein; subsequently conveying the preheated raw food material through a main processing chamber and subjecting the food material to further heating by microwave energy to puff the food material and delivering the resulting puffed foodstuff to an outlet, said screw-conveying means being of a material substantially transparent to micro-waves where the conveying means passes through the main processing chamber, the pitch of said screw-conveying means being wider where said conveying means passes through said main processing chamber than the pitch where the screw-conveying means passes through said preheating chamber.

9. The method as claimed in claim 8 further including the step of metering the raw food material, at a controlled rate, on to conveying means, said conveying means moving the product at a predetermined rate through said preheating and said main processing chambers.

10. The method as claimed in claim 9 further including directing an air current from a microwave generator to displace hot air from said pre-heating chamber into said main processing chamber.

* * * * *